(12) United States Patent
Tani et al.

(10) Patent No.: US 7,221,411 B2
(45) Date of Patent: May 22, 2007

(54) RECEIVING DEVICE FOR USE IN DIGITAL TELEVISION

(75) Inventors: Kazuhiko Tani, Daito (JP); Kazuhide Ishihara, Kadoma (JP); Yusuke Nishida, Ikoma (JP); Manabu Yamamoto, Mukou (JP); Yasuhiro Inui, Yao (JP)

(73) Assignee: Funai Electric Co., Ltd., Daito-shi (JP)

( * ) Notice: Subject to any disclaimer, the term of this patent is extended or adjusted under 35 U.S.C. 154(b) by 1270 days.

(21) Appl. No.: 10/075,586

(22) Filed: Feb. 15, 2002

(65) Prior Publication Data

US 2002/0116704 A1 Aug. 22, 2002

(30) Foreign Application Priority Data

Feb. 15, 2001 (JP) ............................. 2001-038944

(51) Int. Cl.
*H04N 5/50* (2006.01)

(52) U.S. Cl. .................. 348/731; 348/732; 348/725; 725/38

(58) Field of Classification Search ............... 348/731, 348/725, 734, 553, 732; 725/151, 38, 92–93, 725/100, 139, 56, 141–142; H04N 5/50
See application file for complete search history.

(56) References Cited

U.S. PATENT DOCUMENTS 6,775,843 B1 * 8/2004 McDermott ................. 725/151
6,993,782 B1 * 1/2006 Newberry et al. ............ 725/39
7,024,676 B1 * 4/2006 Klopfenstein ................ 725/49
7,061,542 B1 * 6/2006 Ikeguchi ..................... 348/558

FOREIGN PATENT DOCUMENTS

| JP | 62-095028 | 5/1987 |
|---|---|---|
| JP | 05-275977 | 10/1993 |
| JP | 06-204804 | 7/1994 |

* cited by examiner

Primary Examiner—Trang U. Tran
(74) Attorney, Agent, or Firm—Crowell & Moring LLP

(57) ABSTRACT

A receiving device used in a digital television includes an automatic storage section obtains the channel information on physical channels at which a program is broadcast, when the channel information contains any other physical channels therein, registers the physical channels thereof in a channel map, decides whether the physical channel which is switched has been registered in the channel map, and if the physical channel has been registered, not to detect whether a program is broadcast at the other physical channels. In this case, information of any other physical channel is present in a VCT, this other physical channel is registered in the channel map without detecting whether a program is broadcast at the channel. Therefore, the total number of the channels to be detected on whether a program is broadcast can be decreased, thus reducing the time for performing the automatic storage function.

7 Claims, 7 Drawing Sheets

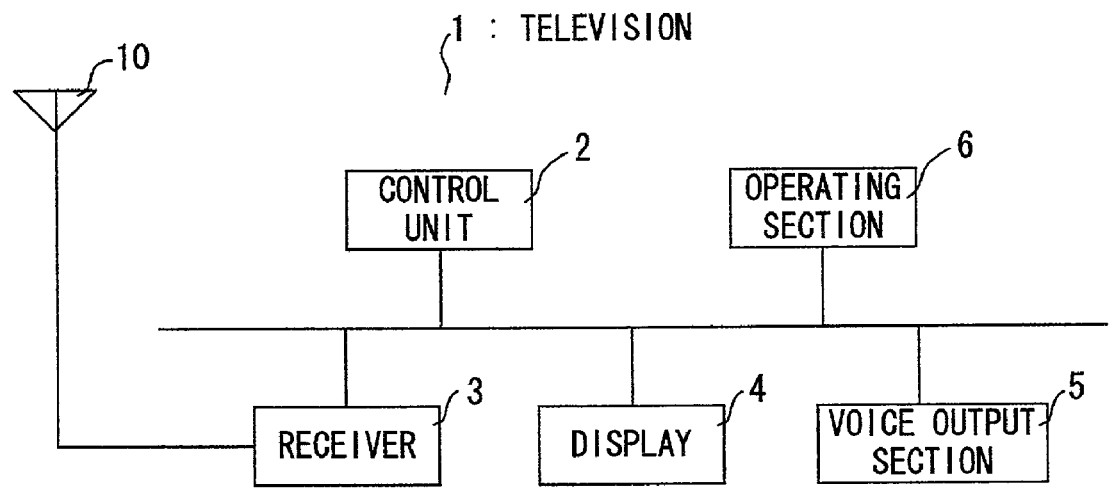

*FIG. 3*  12 : VIEWING-INHIBITED CHANNEL TABLE

| PROGRAM CHANNEL |
|---|
| 10 – 1 |
| 35 – 1 |
| 35 – 2 |
| 41 – 1 |
| ⋮ |

FIG. 5(a)

| VCT ||
|---|---|
| PROGRAM CHANNEL | PHYSICAL CHANNEL |
| 1-1 | 1 Ch |
| 1-2 | 1 Ch |
| 1-3 | 1 Ch |

FIG. 5(b)

| VCT ||
|---|---|
| PROGRAM CHANNEL | PHYSICAL CHANNEL |
| 2-1 | 2 Ch |
| 2-2 | 2 Ch |
| 8-1 | 8 Ch |

RECEIVING DEVICE FOR USE IN DIGITAL TELEVISION

BACKGROUND OF THE INVENTION

The present invention relates to such a receiving device applied to a television that receives a digital broadcast, especially a digital broadcast according to the Advanced Television Standards Committee (ATSC) standard.

There has conventionally been a television available for receiving a program on the air. As well known, each broadcasting station is assigned a carrier wave frequency used in broadcasting of programs. A television is capable of selecting a program to be received by switching a channel.

The television, however, has some channels through which no programs are broadcast among the channels capable of reception therethrough. The television capable of selecting such a channel through which no program is broadcast is troublesome in channel selection by a user. To guard against it, there is such a proposal that the channels through which no program is broadcast should not be selected when the user selects his desired program.

Specifically, such a television is proposed that has a function (which is called an automatic storage function here) whereby all the channels capable of reception therethrough are detected beforehand on whether any program is broadcast through them, so that subsequently a channel map which registers therein only the channels through which a program is broadcast is created and stored, thus inhibiting the selection of a channel not registered in the channel map in usual time.

To create the channel map using this automatic storage function, however, it is necessary to detect all of the channels capable of reception therethrough on whether any program is broadcast therethrough, so that it takes long time to create the channel map. In particular, recently, an increasing number of channels can be accommodated in reception by the device, thus leading to a demand for reduction in time for execution of the automatic storage function.

Japanese Unexamined Patent Publication No. 6-204804 proposes therein a device for selecting only such channels that are specified. Channel selection here refers to such an operation that adjusts the reception state at the receiver into the best condition. This technology, however, does not reduce the time for execution of the automatic storage function.

By digital broadcasting according to the Advanced Television Standards Committee (ATSC) standard, one channel is capable of broadcasting a plurality of programs therethrough at a time. As the number of viewable programs increases, the range of selecting programs by the user expands but, at the same time, there would be such a program (channel) that is not desired in viewing by the user. As the programs increase, the channel selection operation for programs to be viewed becomes troublesome. To solve this problem, there is such a proposal that would inhibit the selection of channels not desired in viewing by the user (see Japanese Unexamined Patent Publication No. 5-275977 and Japanese Examined Patent Publication No. 6-81061).

SUMMARY OF THE INVENTION

It is an object of the invention to provide a receiving device for use in digital televisions capable of reducing the time for executing the automatic storage function.

It is another object of the invention to provide a receiving device for use in digital televisions capable of cutting a troublesome channel selection operation when a program to be viewed is selected.

The receiving device of the invention has the following configuration to solve the problems.

The receiving device used in a digital television, comprises: a receiver for forming a plurality of virtual channels multiplexed onto a physical channel to thereby receive a digital broadcast transmitting channel information indicating a program for each of the virtual channels and attributes of the virtual channels; a channel selecting section for switching the physical channel for the digital broadcast received by the receiver and also switching the virtual channels formed onto the physical channel; an automatic storage section for switching the physical channels at the channel selecting section to thereby detect whether a program is broadcast at each of the physical channels and obtain the channel information of a physical channel at which a program is broadcast and then register the physical channels in a channel map in correlation with the virtual channels; an automatic storage instructing section for instructing the automatic storage section to perform an operation thereof; and a channel storing section for storing a specified virtual channel; wherein: the automatic storage section, when the channel information obtained on the physical channels at which a program is broadcast contains any other physical channels therein, registers the physical channels thereof in the channel map, decides whether the physical channel which is switched at the step has been registered in the channel map, and if the physical channel has been registered, not to detect whether a program is broadcast at the other physical channels and also inhibits the virtual channels stored in the channel storing section from being registered in the channel map; and the channel selecting section usually inhibits the physical channels and the virtual channels not registered in the channel map from being selected.

In this configuration, the channels through which a program is broadcast are registered in a channel map by the automatic storage section. By digital broadcasting according to, for example, the ATSC (Advanced Television Standards Committee) standard, a plurality of virtual channels multiplexed onto a physical channel are formed, so that channel information (Virtual Channel Table: VCT) that indicates the program for each of these virtual channels and the attributes of the virtual channels is transmitted. The automatic storage section obtains the channel information of those channels (physical channels) that are detected that they are broadcasting a program therethrough and then registers this channel information in a channel map together with other channels (other physical channels) if their information is contained in this channel information. In this step, a channel (physical channel) whose channel information is obtained might well be registered in the channel map in correlation with the corresponding virtual channels. Also, these other channels are not detected on whether a program is broadcast therethrough.

Thus, it is possible to reduce the number of channels that must be detected on whether a program is broadcast therethrough, thus resulting in a reduction in the time for executing at the automatic storage section, that is, the time for creating a channel map.

Also, the user can perform the automatic storage function at an arbitrary timing. It is, therefore, possible to perform the automatic storage function in case of need, for example, when the user has moved and had a different broadcasting station from which he can receive programs.

Also, in usual time, the channels (physical channels) through which no program is broadcast are inhibited from being selected, thus cutting the troublesome channel selection operations by the user.

Also, by storing in a channel storing section beforehand those channels that are not desired in viewing by the user, it is possible to avoid selecting those undesired channels in usual channel selection operations. It is, therefore, possible to cut the troublesome channel selection operations by the user.

The channel stored in the channel storing section may be a virtual channel or a physical channel.

BRIEF DESCRIPTION OF THE DRAWINGS

FIG. 1 is a block diagram for showing a configuration of a television according to an embodiment of the invention.

FIG. 2 is an illustration for showing a channel map in the television according to the embodiment of the invention.

FIG. 3 is an illustration for showing a viewing-inhibited channel table in the television according to the embodiment of the invention.

FIGS. 5(a) and 5(b) are illustrations for showing a VCT according to the ATSC standard.

DETAILED DESCRIPTION OF THE PREFERRED EMBODIMENT OF THE PRESENT INVENTION

Figure 4:
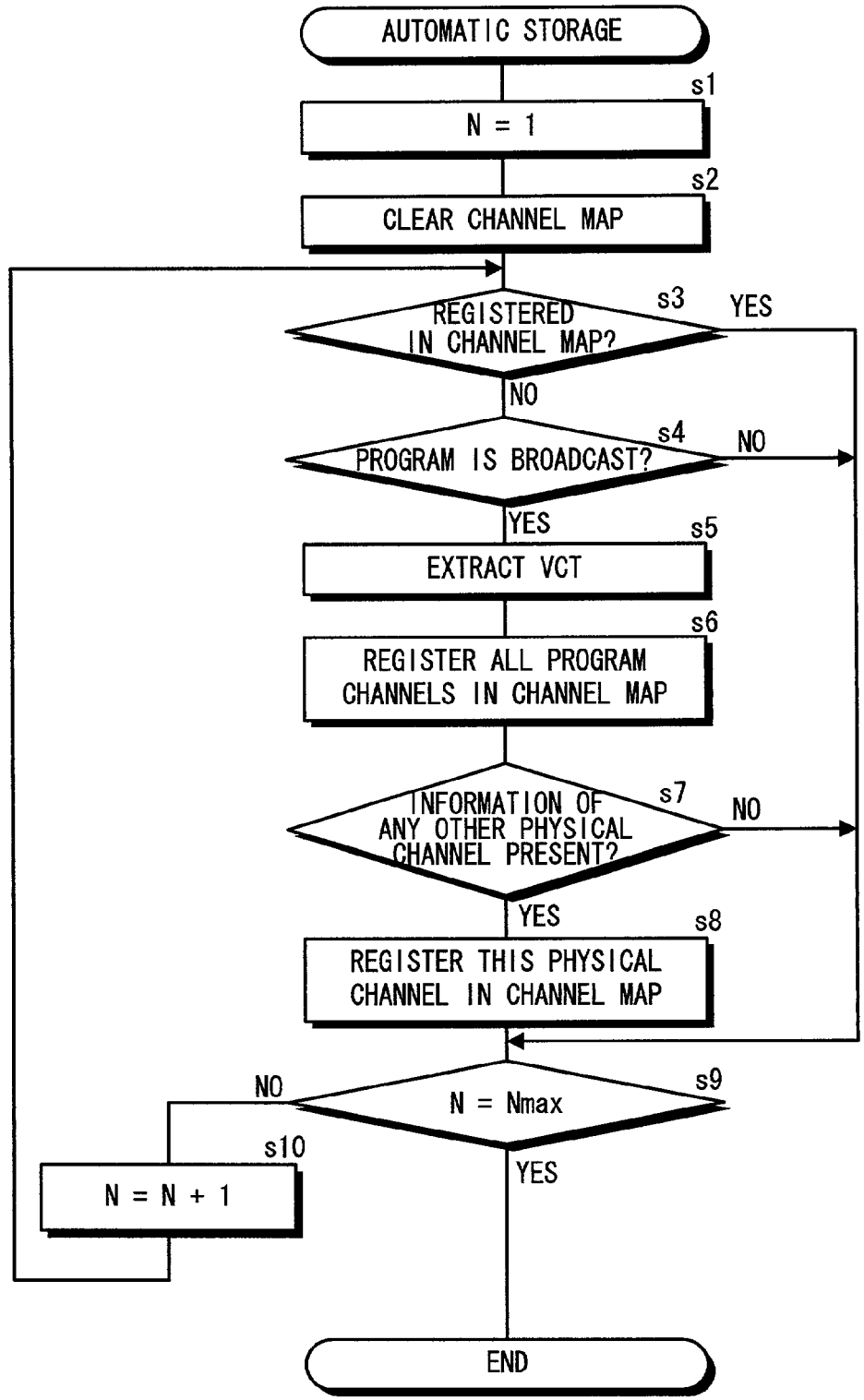
FIG. 4 is a flowchart for showing processing related to an automatic storage function in the television according to the embodiment of the invention.

FIG. 1 is a block diagram for showing a configuration of a television according to an embodiment of the invention. A television 1 of this embodiment receives a digital broadcast according to the ATSC (Advanced Television Standards Committee) standard. A control section 2 controls the operations of the body of the television 1. A receiver 3 takes out a signal, through a selected channel (carrier wave frequency), from a plurality of digital broadcasts received from an antenna 10 and then decodes it into a video signal and a voice signal. A display section 4 displays an image based on the video signal decoded at the receiver 3. A voice output section 5 outputs voice based on the voice signal decoded at the receiver 3. An operating section 6 has a plurality of operation keys used to switch the channel or perform an automatic storage function described later.

The control section 2 is provided with a memory (RAM) for storing the following channel map 11 and viewing-inhibited channel table 12. FIG. 2 shows the channel map. According to the ATSC standard, a plurality of programs can be broadcast through one channel. The channels, therefore, are classified into two types: physical channels for providing physical channels and program channels for providing multiplexed virtual channels. Programs are selected using a program channel. The channel map 11 registers therein the physical channels and the program channels in mutual correlation. In an example shown in FIG. 2, physical channel 1 contains three program channels 1-1, 1-2, and 1-3. That is, three programs are broadcast through physical channel 1.

Also, the viewing-inhibited channel table 12 registers therein the program channels preset by the user. Program channels can be registered to and deleted from the viewing-inhibited channel table 12 by performing predetermined input operations at the operating section 6. The user registers in the viewing-inhibited channel table 12 the program channels broadcasting therethrough such programs that he does not wish to view. In an example shown in FIG. 3, program channels 10-1, 35-1, 35-2, 41-1, . . . are registered as the program channels broadcasting therethrough such programs that the user does not wish to view.

The receiver 3 is comprised of a tuner (channel selecting portion) for taking out and outputting a signal, an intermediate frequency signal (IF signal), corresponds to a selected physical channel from digital broadcasts received from the antenna 10, a SAW (Surface Acoustic Wave) filter for filtering the IF signal taken out by the tuner into a signal of a predetermined frequency band, a demodulator for demodulating, by A/D conversion, the IF signal filtered at the SAW (Surface Acoustic Wave) filter, and a decoder for decoding the signal demodulated at the demodulator. The decoder decodes only those programs broadcast through a selected program channel.

The operating section 6 has a remote-controller receiver for receiving a control code transmitted from a remote controller (not shown) in a form of an infrared light or a radio wave. By operating the keys on the operating section 6 or the remote controller, program channels can be selected and the automatic storage function can be utilized.

When a program is selected by the user (usual time as referred to in the invention), the television 1 of this embodiment utilizes the channel map 11 shown in FIG. 2 or the viewing-inhibited channel table 12 shown in FIG. 3 to inhibit the selection of a channel through which no program is broadcast and a channel inhibited in viewing. With this, it is possible to avoid useless and troublesome channel selection operations by the user.

The following will describe the automatic storage function (automatic storage section, automatic storage indicating section) utilized by the control section 2 of this television 1. The automatic storage function refers to a function to create the above-mentioned channel map 11, so that each time this function is executed, the channel map 11 is updated. The television executes the automatic storage function when the operating section 6 gives an instruction or the remote controller gives a control code to that effect.

FIG. 4 is a flowchart for showing processing by the automatic storage function, that is, processing of updating the channel map. The television 1 sets the physical channel (N) to an initial value of channel 1 (s1) and clears the channel map 11 (s2). Then, the television 1 decides whether the set physical channel has been registered in the channel map 11 (s3).

If it is not yet to be registered in the channel map 11, the television 1 receives a physical channel set at the receiver 3 to decide whether a program is broadcast at this physical channel therethrough (s4). If it is not broadcast, the television 1 jumps to step s9. If it is broadcast, on the other hand, the television 1 takes out a VCT (Virtual Channel Table) transmitted through this physical channel (s5).

As mentioned above, by the ATSC standard, to enable one physical channel to broadcast a plurality of programs therethrough, it can be provided with multiplexed virtual channels (program channels). The VCT refers to a table that registers therein the information of the attributes of these virtual channels. Specifically, it refers to a table in which program channels and physical channels are correlated with each other as shown in FIG. 5. As shown in FIGS. 5(a) and 5(b), the VCT has therein the information of all the program channels of programs broadcast through physical channel which are set. Also, as shown in FIG. 5(b), there may be information of such program channels that correspond to other physical channels.

The television 1 registers the set physical channel in the channel map 11 in correlation with program channels obtained from the VCT (s6). With this, the channel map 11 registers therein the information which correlates the set physical channel and the program channels contained therein with each other.

Then, the television 1 decides whether the VCT contains information indicating any other physical channels (s7) and, if there are any other physical channel, registers it in the channel map 11 (s8). At step s8, no program channels corresponding to this physical channel are registered. The reason is that none of the program channels corresponding to this physical channel can be known. This physical channel, however, contains at least one program channel. It is, therefore, evident that a program is broadcast at this physical channel therethrough, so that it does not matter in particular to register only physical channels in the channel map 11 at step s8.

At step s9, the television 1 decides whether the number of the set physical channels is the maximum number (Nmax) of the receivable channels and, if not, increments the number of reception channels N (N=N+1) (s10) to then return to step s3 to repeat the above processing. If it decides the maximum number of the receivable channels is reached, the television 1 end the processing.

Thus, if a VCT received at step s5 contains not only the information of the selected physical channels but also the information of any other physical channels, the television 1 of this embodiment registers this physical channel in the channel map 11 at step s8. Also, the television does no perform processing of steps s4 to s8 on physical channels registered in the channel map 11 at step s3. With this, therefore, the time can be reduced for performing processing on the physical channels registered in the channel map 11 at step s8, thus resulting in reduction in the time for performing the automatic storage function, that is, the time for creating the channel map 11.

As mentioned above, although no program channels are registered of such a physical channel registered in the channel map 11 at step s8, it is no problem because the program channels are registered in the usual channel selection operation described below.

Figure 6:
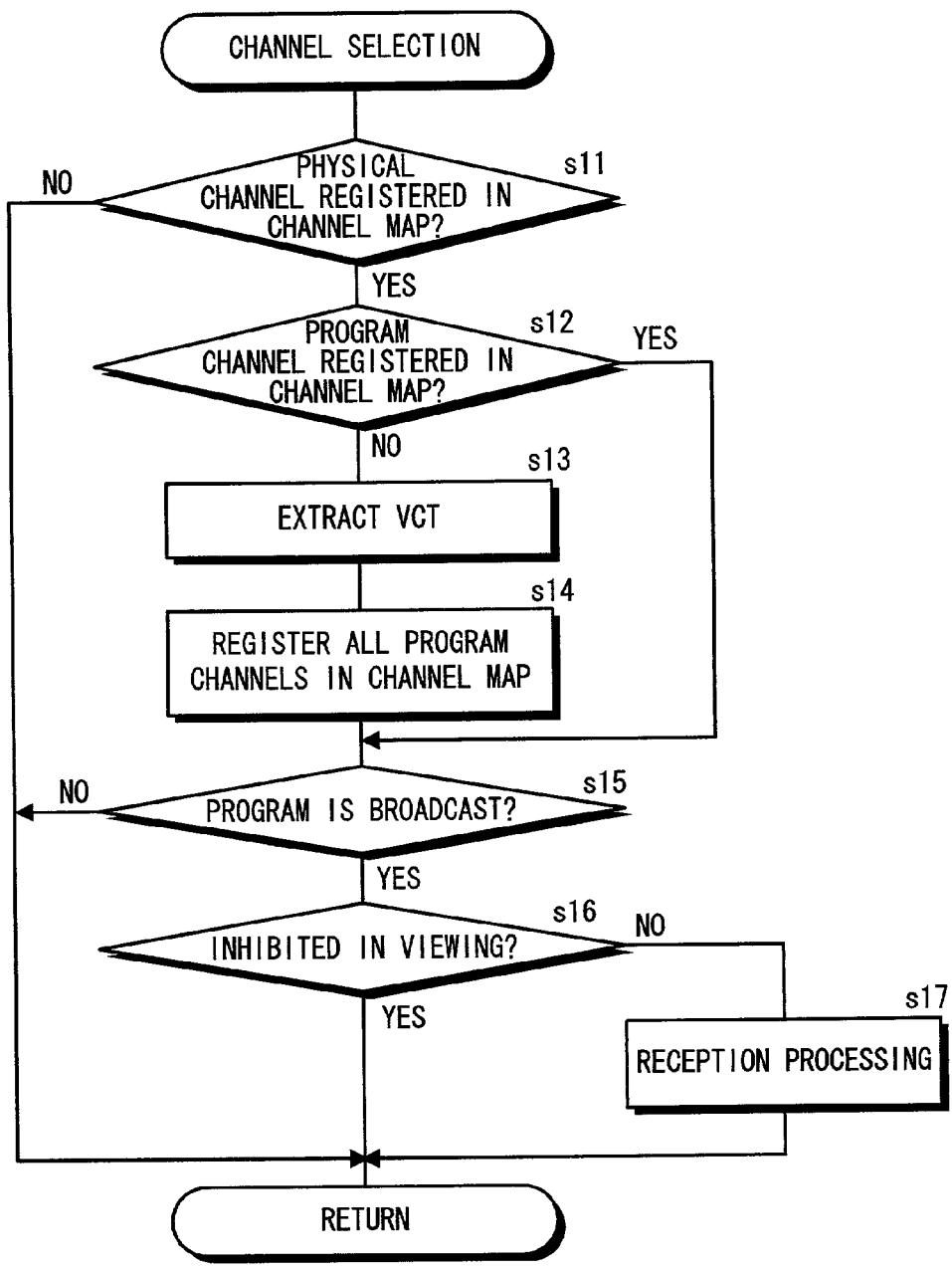
FIG. 6 is a flowchart for showing channel selection in the television according to the embodiment of the invention.

FIG. 6 is a flowchart for showing operations of channel selection. The television 1 decides whether a physical channel corresponding to a selected program channel (input program channel) is registered in the channel map 11 (s11). If it is not registered in the channel map 11, the selected channel is not broadcasting a program therethrough. The television, therefore, decides it is due to user's mistake in channel selection (mistake in inputting) and then ends the processing.

If it is registered in the channel map 11, on the other hand, the television decides whether at least one program channel is registered in the channel map 11 in correlation with this physical channel (s12). If no program channel is registered, it takes out a VCT transmitted through this physical channel (s13) and registers all the program channels corresponding to this physical channel in the channel map 11 (s14).

With this, the program channels of a physical channel registered in the channel map 11 at step s8 are also registered.

Next, the television 1 decides whether a program is broadcast through the selected program channel (s15). At step s15, decision is made on the basis of whether the selected program channel is registered in the channel map 11. If no program is being broadcast, the television 1 decides it is due to a user's mistake in channel selection (mistake in inputting) and ends the processing. If a program is being broadcast, the television decides whether the selected program channel is inhibited in viewing (s16). This decision is made on the basis of whether the selected channel is registered in the viewing-inhibited channel table 12. If the program channel is inhibited in viewing, the television 1 decides it is due to a user's mistake in channel selection (mistake in inputting) and ends the processing. If it is not inhibited in viewing, on the other hand, the television 1 receives a program broadcast through this program channel (s17).

Thus, the television 1 of this embodiment receives nothing if a selected program channel is broadcasting no program or if it is inhibited by the user in viewing beforehand. When the user selects a channel for broadcasting a program the user wish to view, therefore, the device receives nothing through a useless program channel, thus avoiding troublesome channel selection operations by the user.

Figure 7:
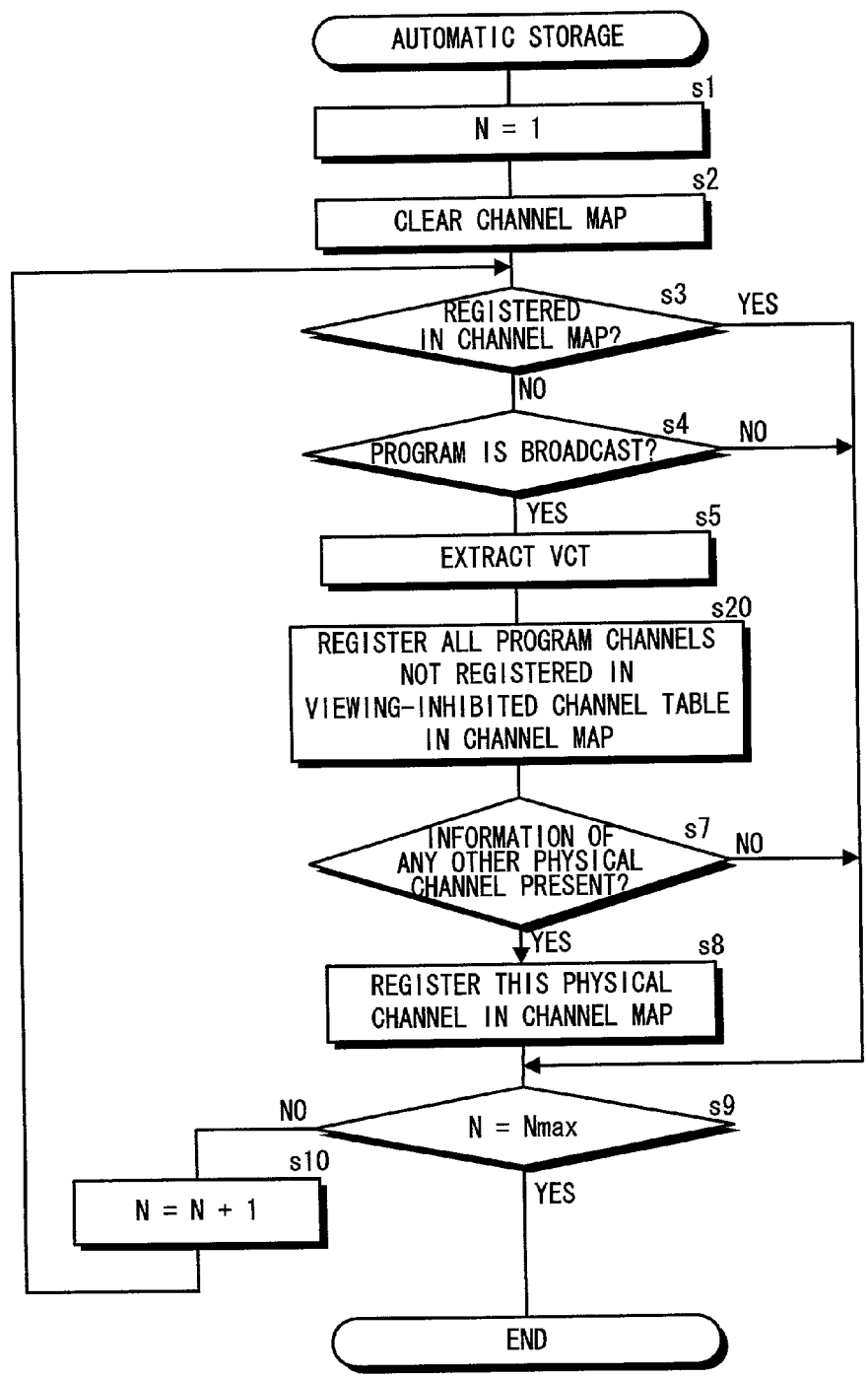
FIG. 7 is a flowchart for showing processing related to the automatic storage function in the television according to another embodiment of the invention.

Although the television 1 of this embodiment is supposed to register in the channel map 11 all the program channels broadcasting a program therethrough, such program channels that are registered in the viewing-inhibited channel table 12 may not be registered in the channel map 11. This can be realized by performing the processing shown in FIG. 7 in place of that shown in FIG. 4. In FIG. 7, the same processes as those in FIG. 4 are indicated by the same step numbers.

As shown in FIG. 7, the processing of step s6 in FIG. 4 is just replaced by step s20. At step s20, only such a program channel that is not registered in the viewing-inhibited channel table 12 is registered in the channel map 11, while a program channel registered in the viewing-inhibited channel table 12 is not registered in the channel map 11.

The channel map 11, therefore, registers therein such a program channel that is broadcasting a program and not inhibited by the user in viewing.

Figure 8:
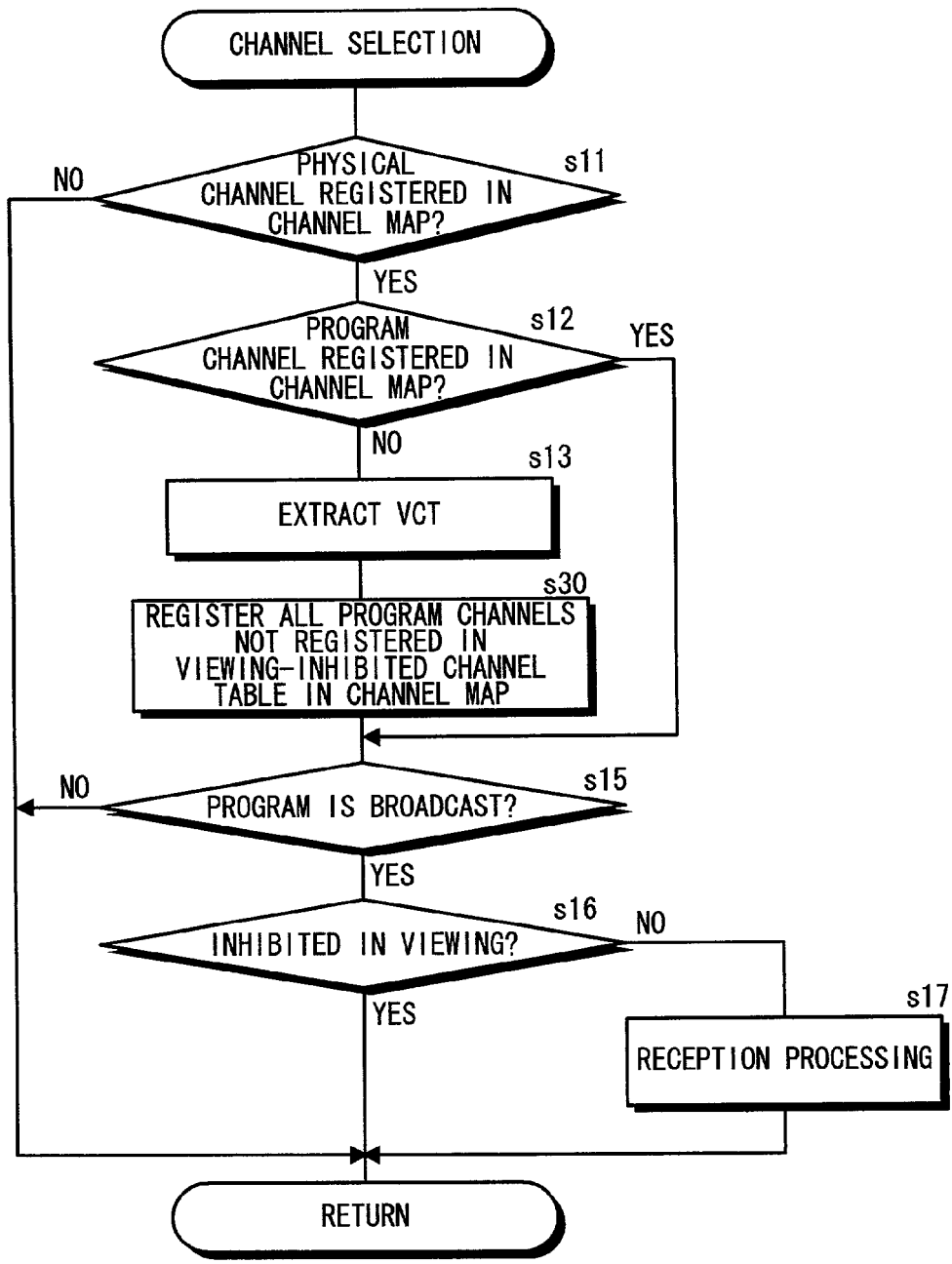
FIG. 8 is a flowchart for showing channel selection in the television according to the another embodiment of the invention.

Also, the channel selection operations by the television 1 are shown in FIG. 8. The same processes as those in FIG. 6 are indicated by the same step numbers.

FIG. 8 is the same as FIG. 6 with only one exception that step s14 is replaced by step s30. Step s30 is the same as step 20 above in processing in that only such a program channel that is not registered in the viewing-inhibited channel table 12 is registered in the channel map 11 and such a program channel that is registered in the viewing-inhibited channel table 12 is not registered in the channel map 11.

The processes at steps s15 and s16 can be performed by making only one decision on whether a selected program channel is actually registered in the channel map 11. Even such processing has almost the same effects as those by the television 1 of this embodiment.

Although in this embodiment the viewing-inhibited channel table 12 is supposed to register therein program channels, it may register physical channels therein. In this case, all the program channels of the registered physical channel can be inhibited in viewing.

Thus, the invention makes it possible to reduce the time for creating a channel map which registers therein only such channels that are broadcasting a program therethrough. Also, even when the channel map is updated, such a channel that is inhibited in viewing by the user beforehand may not be permitted to receive a program therethrough. It should be noted that the invention is not limited to the configuration of the above-mentioned embodiment but may be subject to various variants without departing from the gist of the invention.

What is claimed is:

1. A receiving device used in a digital television, comprising:
   a receiver for forming a plurality of virtual channels multiplexed onto a physical channel to thereby receive a digital broadcast transmitting channel information indicating a program for each of the virtual channels and attributes of the virtual channels;
   a channel selecting section for switching the physical channel for the digital broadcast received by the receiver and also switching the virtual channels formed onto the physical channel;
   an automatic storage section for switching the physical channels at the channel selecting section to thereby detect whether a program is broadcast at each of the physical channels and obtain the channel information of a physical channel at which a program is broadcast and then register the physical channels in a channel map in correlation with the virtual channels;
   an automatic storage instructing section for instructing the automatic storage section to perform an operation thereof; and
   a channel storing section for storing a specified virtual channel,
   wherein the automatic storage section, when the channel information obtained on the physical channels at which a program is broadcast contains any other physical channels therein, registers the physical channels thereof in the channel map, decides whether the physical channel which is switched has been registered in the channel map, and if the physical channel has been registered, does not detect whether a program is broadcast at the other physical channels and also inhibits the virtual channels stored in the channel storing section from being registered in the channel map, and
   wherein the channel selecting section usually inhibits the physical channels and the virtual channels not registered in the channel map from being selected.

2. A receiving device used in a digital television, comprising:
   a receiver for forming a plurality of virtual channels multiplexed onto a physical channel to thereby receive a digital broadcast transmitting channel information indicating a program for each of the virtual channels and attributes of the virtual channels;
   a channel selecting section for switching the physical channel for the digital broadcast received by the receiver and also switching the virtual channels formed onto the physical channel;
   an automatic storage section for switching the physical channels at the channel selecting section to thereby detect whether a program is broadcast at each of the physical channels and obtain the channel information of a physical channel at which a program is broadcast and then register the physical channels in a channel map in correlation with the virtual channels; and
   an automatic storage instructing section for instructing the automatic storage section to perform an operation thereof; and a channel storing section for storing a specified virtual channelU,
   wherein the automatic storage section, when the channel information obtained on the physical channels at which a program is broadcast contains any other physical channels therein, registers the physical channels thereof in the channel map, decides whether the physical channel which is switched has been registered in the channel map, and if the physical channel has been registered, does not detect whether a program is broadcast at the other physical channels, and
   wherein the channel selecting section usually inhibits the physical channels not registered in the channel map and the virtual channels stored in the channel storing section from being selected.

3. A receiving device used in a digital television, comprising:
   a receiver for receiving a digital broadcast; a channel selecting section for switching a channel for the digital broadcast received by the receiver;
   an automatic storage section for switching the channels at the channel selecting section to thereby detect whether a program is broadcast at each of the channels and register such a channel at which a program is broadcast in a channel map,
   wherein the digital broadcast transmits channel information indicating attributes of the virtual channels multiplexed to the channel, and
   wherein the automatic storage section obtains the channel information on channels at which a program is broadcast, when the channel information contains any other channels therein, registers the channels thereof in the channel map, decides whether the channel which is switched has been registered in the channel map, and if the channel has been registered, does not detect whether a program is broadcast at the other channels.

4. The receiving device used in a digital television according to claim 3, further comprising an automatic storage instructing section for instructing the automatic storage section to perform an operation thereof.

5. The receiving device used in a digital television according to claim 3, wherein the channel selecting section usually inhibits the channels not registered in the channel map from being selected.

6. The receiving device used in a digital television according to claim 3, further comprising a channel storing section for storing a specified channel, so that the automatic storage section inhibits the channels stored in the channel storing section from being registered in the channel map even if a program is broadcasted through the channels.

7. The receiving device used in a digital television according to claim 3, further comprising a channel storing section for storing a specified channel, so that the channel selecting section usually inhibits the channel stored in the channel storing section from being selected.

* * * * *